(12) United States Patent
Oettl

(10) Patent No.: US 6,299,230 B1
(45) Date of Patent: Oct. 9, 2001

(54) DEVICE FOR SECURING QUICK-RELEASE, DISPLACEABLE AND QUICK-LOCKING MOTOR VEHICLE EQUIPMENT

(76) Inventor: Heinrich Oettl, Adi-Maislinger-Strasse 8, 81373 München (DE)

(*) Notice: Subject to any disclaimer, the term of this patent is extended or adjusted under 35 U.S.C. 154(b) by 0 days.

(21) Appl. No.: 09/462,544

(22) PCT Filed: Jul. 10, 1998

(86) PCT No.: PCT/EP98/04316
§ 371 Date: Mar. 6, 2000
§ 102(e) Date: Mar. 6, 2000

(87) PCT Pub. No.: WO99/02366
PCT Pub. Date: Jan. 21, 1999

(30) Foreign Application Priority Data
Jul. 10, 1997 (DE) .......................................... 297 12 180 U

(51) Int. Cl.[7] .............................................. B60N 2/02
(52) U.S. Cl. ............................................... 296/65.03
(58) Field of Search ................ 296/65.03; 297/344.1; 248/429, 430

(56) References Cited
U.S. PATENT DOCUMENTS 3,652,050 * 3/1972 Marrujo et al. .
3,800,713 * 4/1974 Nordstrom .
4,776,533 * 10/1988 Sheek et al. .
5,489,172 * 2/1996 Michler .

* cited by examiner

Primary Examiner—Joseph D. Pape
Assistant Examiner—Scott Carpenter
(74) Attorney, Agent, or Firm—Anthony J. Casella; Gerald E. Hespos

(57) ABSTRACT

The invention relates to an appliance for the rapidly releasable, displaceable and rapid-retention fixing of a piece of vehicle equipment in a vehicle, comprising a housing (F), clamping elements (B) which protrude from the housing (F) and have at least one projection in order to engage behind a protrusion on the vehicle or a fixing part fixed on the latter, at least one first tightening element (D), which can be displaced essentially in the direction in which a clamping effect is produced and on which the clamping elements (B) can be fixed, and at least one second tightening element (C) which can be moved perpendicularly to the first tightening element and brings about a displacement of the first tightening element (D) and thus of the clamping elements (B) so as to achieve a clamping effect by frictional engagement, and a positioning device (A) which is provided at a fixed spacing from the clamping elements (B) and can be moved into and out of force-maintained engagement with the vehicle and/or the fixing part fixed to the latter.

9 Claims, 1 Drawing Sheet

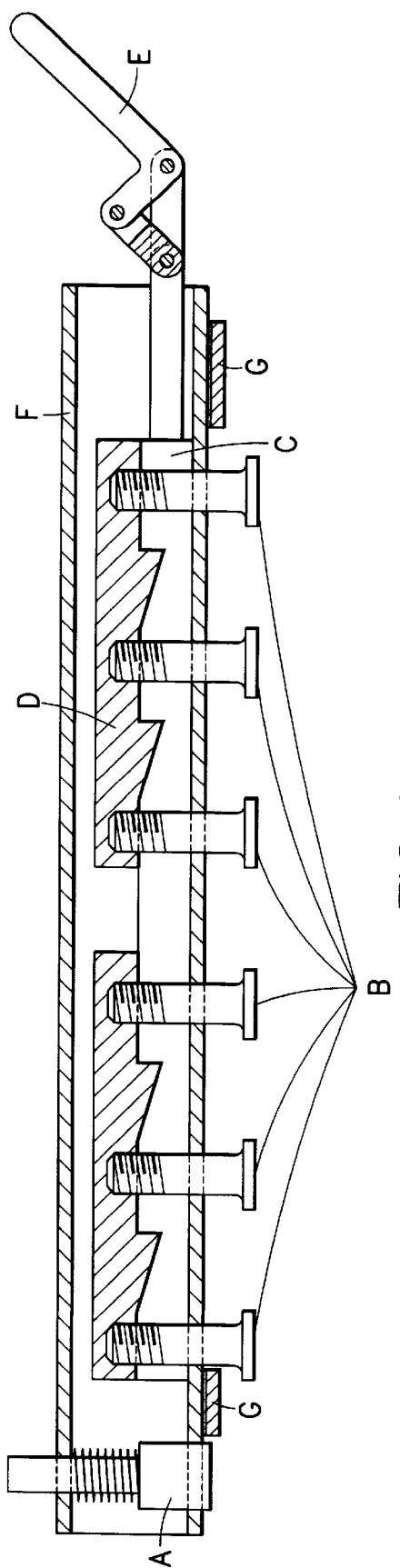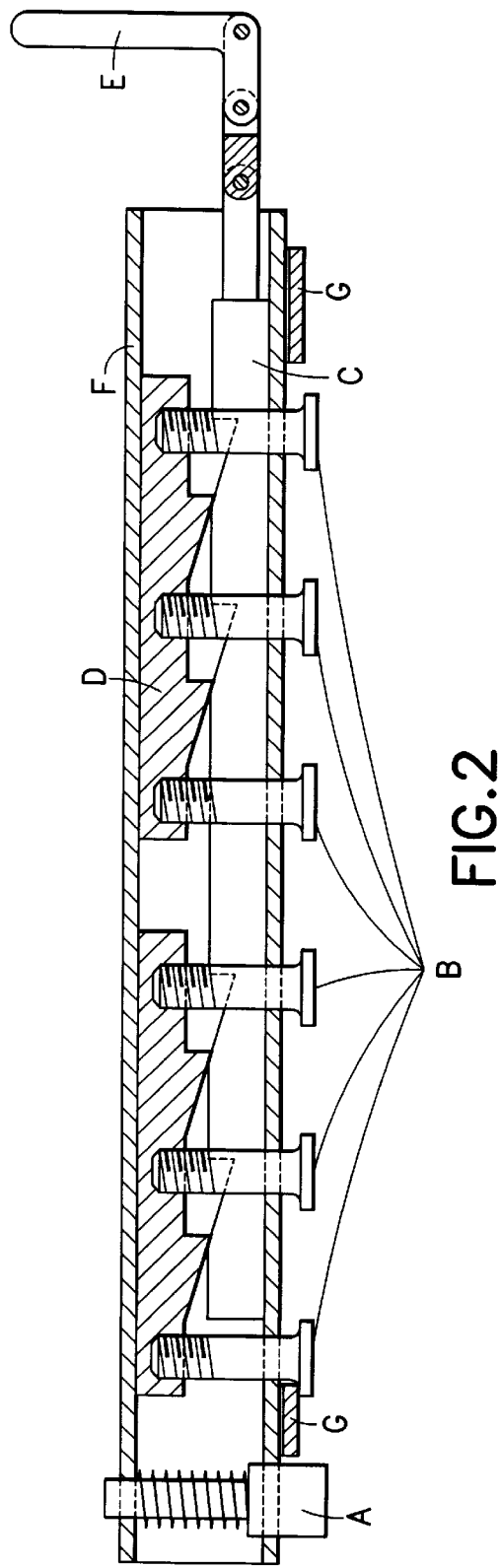

DEVICE FOR SECURING QUICK-RELEASE, DISPLACEABLE AND QUICK-LOCKING MOTOR VEHICLE EQUIPMENT

DESCRIPTION

The invention relates to an appliance for the rapidly releasable, displaceable and rapid-retention fixing of a piece of vehicle equipment, such as a seat, a bench seat, a table or the like, in a vehicle, in particular a motor vehicle. In particular, but not exclusively, the invention relates to a rapid-retention seat rail which is provided for arrangement between the vehicle floor and the seat and allows simple and convenient adjustment and also removal of the seat.

Customary appliances for rapid adjustment of seats, in particular seats with integral safety belts in vehicles, customarily comprise two rails, between which balls are provided for the purpose of support. One of the rails is firmly connected to the seat and the other is firmly connected to the body. However, these known appliances provide only a limited adjustment range and also do not allow the seat to be released rapidly and in a simple manner from the body when required.

DE-A-195 20 959 has disclosed a quick-change fitting, in particular for multi-hole rails in aircraft. The known fitting comprises a housing in which mushroom-shaped feet are mounted, these being actuable by means of an eccentrically mounted pivoting lever to fix or release the fitting by means of clamping. A peg is furthermore provided on the housing of the known appliance and is intended to engage in the slot of the multi-hole rail to provide guidance, an eccentric shaft mounted in the housing and having the feet fixed to it being longitudinally displaceable in the released state, with the result that the peg arranged between the feet is spaced apart from the feet to a variable extent. This known quick-change fitting is thus suitable for achieving rapidly releasable fixing of, for example, seats in an aircraft, but there is no possibility of adjustment or displacement, in particular adjustability with the possibility of retention. Due to the variable spacing between the pegs and the feet, the arrangement of the quick-change fitting can furthermore be inconvenient and time-consuming, and there is the additional risk that the fitting will not be arranged completely outside the holes in the multi-hole rail, with the result that unintended disengagement can occur. Finally, there is also inadequate reliability with the known appliance since fixing is exclusively by frictional engagement.

GB-A-2 219 493 discloses a seat anchoring system, a seat fixed to a support being fixed to a floor rail, a member with clamping elements being fixed to the support. The clamping elements can engage in apertures in the floor rail to fix the support. This document also discloses a clamping device which is fixed to the support and can be rotated by means of a lever to move the block upward and the support downward, thereby fixing the clamping elements to the floor rail. However, the known anchoring system has the disadvantage that it has a complex structure, with the result, in particular, that it has a high unit price and does not allow rapid-retention fixing of the seat.

It is therefore the object of the present invention to provide a simple and rapid-retention fixing appliance for a piece of vehicle equipment.

According to the invention, this object is achieved by an appliance in accordance with claim 1. Preferred embodiments are the subject matter of the dependent claims.

Accordingly, it is advantageously made possible to fix any piece of vehicle equipment in a vehicle in a rapidly releasable manner, this fixing making possible displacement or adjustment and rapid and convenient retention and satisfying high standards of reliability. In particular, the appliance should additionally ensure, on the one hand, that fixing is reliable at all times and, on the other hand, that unintended release of fixing is excluded, even if acted upon by high forces.

In particular, the invention provides a very reliable appliance for the rapidly releasable, displaceable and rapid-retention fixing of a piece of vehicle equipment, such as a seat, in particular a seat with a safety belt, in a vehicle, such as a motor vehicle or even an aircraft or the like. The appliance according to the invention comprises a housing and clamping elements protruding from the housing, preferably at least three clamping elements, each of which has at least one projection in order to engage behind a protrusion on the vehicle or a fixing part fixed on the latter, in particular a multi-hole slotted rail. The appliance comprises at least one displaceable first tightening element, on which the clamping elements can be fixed individually or in groups and which can be displaced in a direction in which the desired clamping effect is achieved. In particular, the first tightening element is displaceable in a vertical direction. The movement of the first tightening element can be guided by a guide of the clamping elements or by a device to be provided separately, e.g. sliding rails or a special configuration of the housing. At least one second tightening element is furthermore provided, this being movable essentially perpendicular to the first tightening element and bringing about a displacement of the first tightening element and thus likewise of the clamping elements. In particular, the second tightening element is displaceable in a horizontal direction. The displacement of the second tightening element causes the first tightening element and thus also the clamping elements fixed to it to be displaced and, in particular, raised so as to achieve a clamping effect by frictional engagement, and, in particular, the abovementioned protrusion is clamped between the housing and the projections. Finally, the appliance according to the invention also comprises a positioning device which has a fixed spacing from the clamping elements and is provided to effect a releasable force-maintained connection to the vehicle or the fixing component fixed to the latter.

Thanks to the combination of force-maintained engagement of the positioning device and the frictional engagement produced by the clamping elements, it is possible to achieve a connection which is very strong overall and which is not released even when acted upon by large forces. The fixed spacing between the positioning device and the clamping elements furthermore prevents the clamping elements from slipping and thus prevents possible disengagement. Once the positioning device and the clamping elements have been released, displacement can take place, which can be arrested rapidly by means of the positioning device, after which it is sufficient to move the clamping elements back into engagement by a relative motion of the tightening elements. It is particularly advantageous here if the clamping elements are coupled mechanically to the positioning device. On the one hand, this thus provides the possibility of locking or releasing the appliance by simple actuation. On the other hand, this provides the possibility of allowing the release of the clamping elements only when the positioning device has been released or vice versa.

According to the invention, the tightening elements have mutually opposite complementary surfaces, these being designed as oblique or wedge faces. This is a particularly simple means of converting a vertical movement of the second tightening element linearly into a horizontal displacement of the first tightening element. With appropriate alignment, the provision of wedge faces can additionally increase the reliability of the appliance. If, for instance, the appliance is mounted in a motor vehicle, the wedge faces can be aligned in such a way that in the case of a braking action, for example, the clamping effect of the clamping elements is increased by virtue of the occurring inertia forces by means of the conversion via the oblique faces. In the case of a particularly simple configuration, it would be possible, by way of example, for a first tightening element to be provided for each clamping element, in which case an oblique face would have to be provided in each case for its actuation. If a plurality of clamping elements is fixed in a grouped manner on one of the first tightening elements, it is sufficient to provide just one wedge or oblique face, but it is advantageous for symmetrical force transmission to provide at least two oblique or wedge faces. If the mutually opposite complementary surfaces are arched or are similar to a cam portion, it is furthermore possible to achieve a nonlinear actuation characteristic of the clamping elements. It is thus possible, for example, for a pronounced displacement of the first tightening element to occur at the beginning of the movement of the second tightening element, whereas the displacement is relatively small at the end of this movement, while the introduction of force is correspondingly increased.

The appliance is preferably used in combination with a multi-hole slotted rail or a slot in the form of a multi-hole divided up in grid form, which is provided on the vehicle. The multi-hole slotted rail or slot preferably comprises an elongate opening with superimposed circular holes or apertures and, in particular, the holes are preferably spaced apart by a defined or standardized grid spacing. Particularly when cars, aircraft, buses or the like are provided with such multi-hole slots, there is a wide variety of possible positions that can be fixed. In this preferred embodiment, the respective relative position of the appliance in relation to the multi-hole slot is determined by the positioning device.

The fixed spacing between the positioning device and the respective clamping elements is preferably an integral multiple of the grid spacing of the multi-hole slot plus a certain length, in particular preferably plus half a grid length. This ensures that, after the engagement of the positioning device, none of the clamping elements is at the level of a hole, thus preventing unintended disengagement. In this context, it should also be mentioned that the individual clamping elements are spaced apart relative to one another, preferably essentially by the grid spacing, with the result that, overall, they are either at positions corresponding to the holes or not, as required, in particular, for clamping fast and as determined by the positioning device.

The projections of the clamping elements preferably correspond in shape and size essentially to the holes in the multi-hole slot, allowing them to be introduced into and removed from the holes in a simple manner, given corresponding arrangement, preferably with slight play or no play. It is furthermore preferred that, above the projections, the clamping elements should practically correspond in size to those portions of the multi-hole slot in which there is no hole. On the one hand, this ensures that the clamping elements are sufficiently sturdy and, on the other hand, allows the clamping elements to serve as guide elements during a relative displacement of the appliance in relation to the multi-hole slot.

According to a preferred embodiment, the positioning device is provided in the form of a latching pin which essentially corresponds in cross section to the shape and size of a hole in the multi-hole slot. By means of such a configuration of the positioning device, the maximum possible force-maintained engagement is achieved. The latching pin is preferably moved into and out of engagement by means of an upward and downward movement. As already mentioned above, it is possible to couple the movement of the positioning device to the movement of the clamping elements.

According to an alternative embodiment, the positioning device is moved into and out of engagement with the multi-hole slot by means of twisting. For this purpose, the positioning device is preferably provided in the form of a rotary pin which, in a cross-sectional view, has essentially the shape of an ellipse or a circle with two flattened sides or two circular segments subtracted from it. In this cross-sectional view, the largest dimension preferably corresponds to the hole diameter and the smallest dimension corresponds practically to the slot width. It is particularly preferable if the positioning device is such that there is force-maintained engagement in relation to the multi-hole slot in a first angular position, in particular via a portion which is as large as possible, while in an orientation rotated through 90°, the positioning device is out of engagement with the hole and can slide through the slotted portion of the multi-hole slot.

Essentially in alignment with the clamping elements, the appliance preferably has at least one sliding element, this sliding element on the one hand reducing the sliding friction during displacement and on the other hand being arranged in the slotted portion of the multi-hole slot and thus guiding the displacement. To provide enhanced guidance, the sliding element should preferably be longer than the diameter of the holes, thus ensuring contact with a slotted portion in all cases.

The tightening elements C and D are preferably arranged in the housing in such a way that self-locking occurs in at least one predetermined position. This can, for example, be achieved by means of partially roughened or wavy complementary surfaces of the tightening elements. In particular, it is desirable for the abovementioned self-locking to take place in the closed or locked position, making it necessary first of all to overcome the resistance of the self-locking in order to release the clamping effect.

It is advantageous if the appliance comprises an actuating element, which can, for example, be connected pivotally in the form of a toggle lever to the housing. The toggle lever is furthermore connected pivotally to the second tightening element in order to effect a relative movement. By means of the self-locking effect of a toggle lever, it is also possible to inhibit movement in a predetermined position, thereby preventing unintended disengagement. In the case of a vehicle seat, the actuating element is preferably at the front or face end, i.e. generally in the foot space of the seat, to give easy access which allows rapid and simple release, displacement and retention of the seat. In the engaged or locked or arrested position of the appliance, the operating lever preferably extends in a vertical direction, with the result that only a small installation space is required. In this position, disengagement due to externally acting forces is likewise prevented by the self-locking effect of the toggle lever.

Finally, at least one spring device is preferably provided. The spring device can be provided in order to preload the positioning device, the clamping device, the first tightening element, the second tightening element, the actuating element and/or the sliding element into one of the respective positions. Any number of combinations is, of course, also possible. By providing a spring device, it is possible to provide play-or rattle-free arrangement in relation to the respective element. The respective spring devices also make it possible to achieve an automatic effect or, as an alternative, the spring device can be provided in order to effect active actuation of the respective element. One example that may be mentioned in this case is a spring action on the positioning device, which is preloaded by means of a spring in the engaged position. This means that the positioning device must be actively disengaged to release and/or displace the seat, that is to say, for example, must be pulled out or twisted, to be precise against the action of the spring. By virtue of the purely active actuation, unintended actuation or release can practically be excluded. This preloading furthermore has the effect that, if a grid position has not been properly adopted, simple displacement of the seat is sufficient to effect engagement of the positioning device. A user can thus, for example, displace the seat in a simple manner between respective grid positions without having to observe the appliance for this purpose, as is the case, for example, with the known appliance as disclosed in DE-A-195 20 959.

Further features, advantages and possible applications of the invention will become apparent from the following description of a currently preferred embodiment of the invention, which is given illustratively, purely by way of example, and with reference to the attached drawings, in which:

FIG. 1 shows a sectional view of the preferred embodiment of the appliance according to the invention in an unlocked position, and FIG. 2 shows the embodiment shown in FIG. 1 in an analogous view but in the locked position or position in which it produces a clamping action and is arrested.

In the embodiment illustrated, the appliance is designed as a rapid-retention seat rail which comprises a housing F. In the embodiment illustrated, the housing is formed by a hollow metal profile of essentially rectangular cross section. The housing F is intended for mounting by means of its upper surface on the underside of a seat.

In particular, the embodiment shown is intended to engage in a multi-hole slotted rail which is mounted for this purpose on the vehicle floor. A multi-hole slotted rail is known to the person skilled in the art and can be formed by another hollow metal profile of rectangular cross section. A continuous slot is provided in the longitudinal direction in the upper surface of this profile. Circular openings are furthermore superimposed on the slot in a predetermined grid pattern. For the relative arrangement of the preferred and illustrated embodiment, holes are provided on the underside of the housing F, and clamping elements B are passed through these holes.

In the embodiment shown, the clamping elements B are each formed by a shank with a projection on the lower end portion. The shank diameter of the clamping elements corresponds essentially to the holes in the underside of the housing F and practically to the gap width of the multi-hole rail (not shown). The clamping elements B are spaced relative to one another at the grid spacing of the multi-hole rail, with the result that either all the clamping elements are arranged in alignment with holes in order to arrange the appliance in the multi-hole rail, or not, in order to clamp the appliance firmly relative to the multi-hole rail. In the embodiment shown, six clamping elements B, divided into two groups, are provided. At their upper ends, the clamping elements of each group are connected, e.g. screwed, welded or the like, to two first tightening elements D.

The first tightening element D has a flat surface and four side faces running perpendicular to the latter. Wedge-shaped protrusions are formed on the lower surface of the first tightening element D. In the embodiment shown, two first tightening elements D are shown, these defining between them a small gap, which can be provided, for example, to allow screwing to the seat to be arranged thereabove.

Extending in the housing in the embodiment illustrated, there is furthermore a second tightening element C which, in the embodiment shown, extends on both sides of the clamping elements B without being in direct engagement with the latter. The second tightening element C is arranged underneath the first tightening elements D, the first tightening elements D making contact with and resting on the upper surface of the second tightening element C. For this purpose, the upper side of the second tightening element C is provided with corresponding wedge-shaped recesses which accommodate the wedge-shaped protrusions of the first tightening elements D and are practically in alignment with them.

The guiding function provided by the respective shank of the clamping elements B is assisted in the embodiment by two sliding elements G. The sliding elements G are mounted on the underside of the housing F and extend practically in alignment with the clamping elements B. Although it cannot be seen from the drawings, it should be noted that the width of the sliding elements G should practically correspond to the width of the slot in the multi-hole slotted rail, thus providing corresponding central guidance in addition to and/or independently of the clamping elements B. As is clearly apparent from the embodiment shown, at least the sliding element G arranged on the right-hand side has a length which is greater than the diameter of the hole or bore in the multi-hole rail. Sliding central guidance is therefore maintained continuously, irrespective of the position in the multi-hole rail.

At the left-hand end of the housing F, the positioning device in the embodiment shown is shown as a latching pin. In the embodiment shown, the latching pin A is guided by two holes provided in the housing F. In the embodiment shown, the latching pin A is pulled upward against the action of the spring illustrated so that its underside is practically flush with the housing F. The latching pin A is thus completely out of engagement with respect to the multi-hole rail arranged under it. Any known measures can be taken for the actuation of the latching pin, a direct interaction in relation to the tightening elements D also being conceivable, in particular, although this is not shown.

An actuating device E is provided at the opposite end of the housing F from the latching pin A. In the embodiment shown, the actuating device is provided in the form of a toggle lever which, on the one hand, is pivotally connected to the housing F and, on the other hand, is connected to the second tightening element C. In the embodiment shown, the toggle lever E is in the released position. The toggle lever is here prevented from bending further by mutual engagement between the tightening elements C and D.

In the position shown in FIG. 1, therefore, the appliance can be arranged above the multi-hole rail in a simple manner to allow the seat to be mounted. When installing the seat, care should be taken to ensure that the projections of the clamping elements D, said projections matching the holes in the multi-hole rail in shape and size, are arranged in alignment above the respective holes. The clamping elements B can thus be inserted through the holes in the multi-hole rail. Once the clamping elements have been inserted, the sliding elements G are located in the slots, allowing the appliance to be displaced in the longitudinal direction. Since the shank of each of the clamping elements B practically corresponds in diameter to the slot width of the multi-hole rail, the entire appliance can be displaced as desired along the multi-hole rail in a simple manner. Since the latching pin A is also in the raised position, there is no interaction in relation to this. Once the seat has reached the position desired by the user, he simply releases the latching pin A, with the result that it enters into engagement with the multi-hole rail. If the latching pin A is not in alignment above a hole, the user can cause the latching pin to engage by moving the seat slightly. Since, in the embodiment shown, the latching pin is spaced apart from the next clamping element B by practically half a grid length, it is thus ensured that at least the clamping element B adjacent to the latching pin A is halfway between two holes in the multi-hole rail. Since, in the embodiment shown, the spacing between the respective clamping elements B furthermore practically corresponds to the grid spacing of the holes in the multi-hole rail, all the projections of the clamping elements B are thus located in portions of the multi-hole rail in which no holes are provided. A position of the whole appliance in which an optimum clamping effect can be achieved is thus achieved by simply engaging the positioning device A.

As shown in FIG. 2, the latching pin A now projects from the underside of the housing F and is thus in engagement with the multi-hole rail (not shown) arranged underneath it, namely with one hole in said rail. Subsequent to or simultaneously with the engagement of the latching pin A, the toggle lever E is pivoted in such a way that its knee region is extended and subsequent release is thus only possible by actuating the outer portion of the lever. In the embodiment shown, the extension of the knee region of the toggle lever E displaces the second tightening element C to the right. As can be seen clearly from the figures, the displacement of the second tightening element C causes the first tightening elements D which rest on the second tightening element C to be displaced upward by means of the corresponding wedge faces, taking the clamping elements B along with them. In the position shown in FIG. 2, the distance between the projections of the clamping elements B and the underside of the housing F corresponds practically to the thickness of the multi-hole rail profile, with the result that frictional engagement is achieved by virtue of the clamping effect. This frictional engagement is complemented by the force-maintained engagement of the latching pin A, completely reliable arresting and fixing of the seat thus being achieved.

Starting from the position shown in FIG. 2, all the user has to do to cancel the frictional engagement is to actuate the toggle lever E. If the latching pin A is simultaneously or subsequently disengaged, the appliance and thus the seat can then be displaced in a simple manner in the longitudinal direction. Thanks to the provision of a multi-hole slotted rail, there is thus practically unlimited adjustability. Once the user has achieved the desired position, the steps described above are repeated simultaneously or in succession. However, if the seat is to be removed from the vehicle, the projections of the clamping elements B are aligned with the holes, allowing the seat to be removed completely simply by lifting it up and out.

Although, in the text above, the invention has been described completely with reference to a specific embodiment, it should be recognized that various changes and modifications can be made within the scope of the invention. Thus, for example, it would be possible, though not shown in the drawings, for the positioning device A to be a rotary pin which could be rotated between two positions offset by 90° to bring it into and out of engagement, respectively, with a hole in the multi-hole rail. In this case, the rotary pin A should have practically the shape of an ellipse or, more preferably, the shape of a circle minus two segments, thus being able to produce force-maintained engagement in one position relative to the hole while being capable of being moved slidably through the multi-hole slot in the other angular position. It is furthermore also conceivable to provide the tightening elements C and D with nonlinear wedge faces. The projections of the clamping elements B could also be formed in the elliptical shape, mentioned above, of the positioning device, thereby making it possible to use the rotatably mounted clamping elements and hence also a simple slot without additional holes.

What is claimed is:

1. An appliance for the rapidly releasable, displaceable and rapid- retention fixing of a piece of vehicle equipment in a vehicle, comprising a housing, clamping elements which protrude from the housing and have at least one projection in order to engage behind a protrusion on a selected one of the vehicle and a fixing part fixed on the vehicle, at least one first tightening element, which can be displaced in a direction in which a clamping effect is produced and on which the clamping elements can be fixed, and at least one second tightening element which can be moved perpendicularly to the first tightening element and brings about a displacement of the first tightening element and thus of the clamping elements to achieve a clamping effect by frictional engagement, and a positioning device which is provided at a fixed spacing from the clamping elements and can be moved into and out of force-maintained engagement with the selected one of the vehicle and the fixing part fixed to the vehicle, wherein the two tightening elements have mutually opposite complementary surfaces, which are designed as oblique wedge faces, the second tightening element being displaceable in a linear manner in relation to the first tightening element, and the movement of the second tightening element being converted by the oblique wedge faces into a movement of the first tightening element which brings about a clamping effect.

2. The appliance of claim 1, which is provided to interact with a slot in the form of a multi-hole rail and divided up in a grid-like pattern, the clamping elements being spaced apart by the grid spacing.

3. The appliance of claim 2, in which the fixed spacing between the positioning device and the respective clamping elements is an integral multiple of the grid spacing plus half a grid length.

4. The appliance of claim 3, in which the projections of the clamping elements correspond in shape and size to the holes in the multi-hole rail, the remaining portions of the clamping elements corresponding in size to those portions of the multi-hole rail in which there is no hole.

5. The appliance of claim 4, in which the positioning device is a latching pin which corresponds in cross section to the shape and size of a hole in the multi-hole rail and can be moved into and out of engagement by means of upward and downward movement, thus providing force-maintained retention.

6. The appliance as claimed in claim 1, in which at least one sliding element is provided to guide the displacement of the appliance.

7. The appliance as claimed in claims 1, in which the two tightening elements are arranged in the housing such that self-locking occurs in at least one predetermined position of the second tightening element with respect to the first tightening element.

8. The appliance as claimed in claim 1, in which an actuating element is connected pivotally to the housing and to the tightening element to selectively effect and inhibit relative motion of the second tightening element.

9. The appliance as claimed in claims 1, in which at least one spring device is provided to preload the positioning device, the clamping elements, the second tightening element, the first tightening element, the actuating element and/or the sliding element into one of the respective positions.

* * * * *